Patented Apr. 13, 1954

2,675,389

UNITED STATES PATENT OFFICE 2,675,389

ARSANILATE SALTS OF HYDROXY-QUINOLINES

Geza S. Delmar, Montreal, Quebec, Canada

No Drawing. Application January 9, 1952,
Serial No. 265,721

8 Claims. (Cl. 260—271)

The present invention relates to new chemical compounds and to their preparation. More particularly it relates to chemical compounds especially effective in the treatment of protozoanic infections, for example, amebiasis and trichomonas vaginitis infections.

PRIOR ART

The treatment of amebiasis or trichomonas vaginitis infections has been done with bismuth salts, arsenicals and 8-hydroxyquinoline, or its derivatives, for example, the chloro-iodo or the diiodo derivatives of 8-hydroxyquinoline. Recently these infections have been treated with salts which are made up of bismuth and arsenicals, for example, bismuth glycolylarsanilate. Since most of these compounds are relatively toxic, and that they must be administered in fairly large doses in order to be effective, for example, 0.5 g. daily in the case of carbarsone (p-carbamylaminophenylarsonic acid) there is always a danger of undesirable side reactions.

It is therefore seen that it is desirable to obtain a compound which will be effective against protozoan infections in relatively small dosages and which will reduce the normally occurring side-reactions to a minimum.

APPLICANT'S DEVELOPMENT

In accordance with the present invention it has been found that salts corresponding to the general formula:

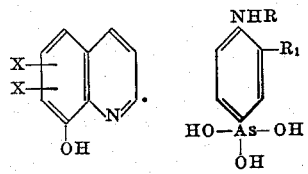

wherein X is halogen, or hydrogen, R is hydrogen, acyl hydroxyacyl or —CONH₂ and R₁ is hydrogen, can be administered in relatively smaller doses than the products of the prior art while reducing side-reactions to a minimum in the treatment of infections of the amebiasis or trichomonas vaginitis type.

The salts of the present invention are obtained by reacting 8-hydroxyquinoline or its halogenated derivatives with arsanilic acid or its acyl derivatives in the presence of a suitable solvent.

The 8-hydroxyquinoline halogenated derivatives which may be used are preferably the chloro-iodohydroxyquinoline or the diiodo-hydroxyquinoline.

The arsanilic acid derivatives used correspond to the general formula:

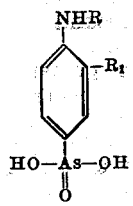

wherein R is hydrogen, acyl, hydroxyacyl, or —CONH₂ and R₁ is hydrogen.

The reaction is carried out in the presence of a solvent for the reactants, for example, methanol, ethanol, or acetone.

EXAMPLES

The preparation of the products of the present invention will be more fully understood by referring to the following examples, but it is to be understood that they are not to be taken as limitative of the invention since equivalent procedures and variations in reactants may be used without departing from the spirit of the invention.

Example 1

14.5 gm. of 8-hydroxyquinoline are reacted in the presence of methanol with 27.5 gm. of glycolylarsanilic acid. The salt of 8-hydroxyquinoline glycolylarsanilate results, which has a melting point of 152°–162° C. under decomposition.

Instead of methanol, also ethanol, acetone or any other suitable solvent may be used in the reaction.

Example 2

Instead of 8-hydroxyquinoline, there may be used in the above reaction, 30.5 gm. of the chloro-iodo derivative (Vioform) and the glycolylarsanilate of chloro-iodohydroxyquinoline will result with a melting point of 177–178° C.

Example 3

Taking in the above example, 39.7 gm. diiodohydroxyquinoline instead of 8-hydroxyquinoline there is obtained diiodoquioline glycolylarsanilate which has a melting point of 191–192° C.

In the above examples, acetarsone, carbarsone or arsanilic acid may be used in the place of glycolylarsanilic acid and we obtain in a similar way the 8-hydroxyquinoline acetarsonate, the 8-hydroxyquinoline carbarsonate or the 8-hydroxyquinoline arsanilate. In the same way there may be obtained chloro-iodohydroxyquinoline or diiodohydroxyquinoline acetarsonates, carbarsonates and arsanilates.

I claim:

1. As new compounds, 8-hydroxyquinoline salts of the general formula:

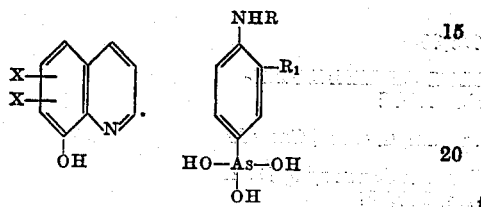

wherein X is a radical selected from the group consisting of halogen and hydrogen, R is a radical selected from the group consisting of hydrogen, acyl, hydroxyacyl, and —CONH₂ and R₁ is hydrogen.

2. As a new compound, the glycolylarsanilate of chloro-iodohydroxyquinoline.

3. As a new compound, the glycolylarsanilate of diiodohydroxyquinoline.

4. As a new compound, the glycolylarsanilate of 8-hydroxyquinoline.

5. A method for preparing the 8-hydroxyquinoline salts of the general formula:

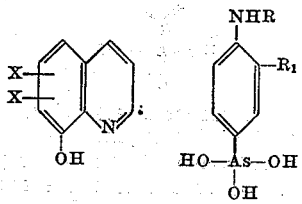

wherein X is a radical selected from the group consisting of halogen and hydrogen, R is a radical selected from the group consisting of hydrogen, acyl, hydroxyacyl, and —CONH₂ and R₁ is hydrogen, comprising, reacting in the presence of a solvent an 8-hydroxyquinoline compound of the formula:

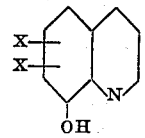

with an arsanilic compound of the general formula:

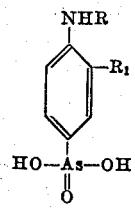

to obtain the desired 8-hydroxyquinoline salts.

6. A method for preparing glycolylarsanilate of chloro-iodohydroxyquinoline, comprising reacting in the presence of a solvent glycolylarsanilic acid with chloro-iodohydroxyquinoline to obtain the desired 8-hydroxyquinoline salts.

7. A method for preparing the glycolylarsanilate of diiodohydroxyquinoline, comprising reacting in the presence of a solvent diiodohydroxyquinoline with glycolylarsanilic acid to obtain the desired 8-hydroxyquinoline salts.

8. A method for preparing the glycolylarsanilate of 8-hydroxyquinoline, comprising reacting in the presence of a solvent 8-hydroxyquinoline with glycolylarsanilic acid to obtain the desired 8-hydroxyquinoline salts.

References Cited in the file of this patent

UNITED STATES PATENTS

| Number | Name | Date |
|---|---|---|
| 2,039,577 | Renda et al. | May 5, 1936 |
| 2,557,353 | Kartsonis et al. | June 19, 1951 |

FOREIGN PATENTS

| Number | Country | Date |
|---|---|---|
| 419,632 | Great Britain | Nov. 13, 1934 |